(12) United States Patent
Kim et al.

(10) Patent No.: US 11,040,894 B2
(45) Date of Patent: Jun. 22, 2021

(54) WATER PURIFIER

(71) Applicant: LG Electronics Inc., Seoul (KR)

(72) Inventors: Myounggon Kim, Seoul (KR);
Youngjin Kim, Seoul (KR); Kowoon Baek, Seoul (KR); Changgeun Lee, Seoul (KR); Jongho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/889,480

(22) Filed: Jun. 1, 2020

(65) Prior Publication Data
US 2020/0290894 A1    Sep. 17, 2020

Related U.S. Application Data

(63) Continuation of application No. 16/355,054, filed on Mar. 15, 2019, now Pat. No. 10,703,647, which is a continuation of application No. 15/592,715, filed on May 11, 2017, now abandoned.

(30) Foreign Application Priority Data

May 13, 2016    (KR) .................. 10-2016-0058989

(51) Int. Cl.
*C02F 1/32*    (2006.01)

(52) U.S. Cl.
CPC ........ *C02F 1/325* (2013.01); *C02F 2201/326* (2013.01); *C02F 2201/3221* (2013.01); *C02F 2303/04* (2013.01)

(58) Field of Classification Search
CPC .............. C02F 1/325; C02F 2201/3221; C02F 2201/326; C02F 2303/04
See application file for complete search history.

(56) References Cited

U.S. PATENT DOCUMENTS

| | | |
|---|---|---|
| 4,523,083 A | 6/1985 | Hamilton |
| 4,528,439 A | 7/1985 | Marney |

(Continued)

FOREIGN PATENT DOCUMENTS

| | | |
|---|---|---|
| CN | 1212301 | 3/1999 |
| CN | 2607363 | 3/2004 |

(Continued)

OTHER PUBLICATIONS

Chinese Office Action in Chinese Appln. No. 201710333972.6, dated Oct. 9, 2020, 21 pages (with English translation).

*Primary Examiner* — Sean M Luck
(74) *Attorney, Agent, or Firm* — Fish & Richardson P.C.

(57) ABSTRACT

A water purifier that includes: a water storage tank that includes an interior area and a first opening to the interior area; a cover unit that is configured to cover the first opening and that includes: a frame body that includes a second opening, and a water storage tank cover that is coupled to the frame body and that is configured to rotate about an axis such that the water storage tank cover opens or closes the second opening; a sterilizer that is configured to sterilize water in the water storage tank; a switching module that is configured to control electric power supply to the sterilizer; and an operation member that is configured to control the switching module based on the water storage tank cover being opened or closed is disclosed.

20 Claims, 9 Drawing Sheets

(56) References Cited

U.S. PATENT DOCUMENTS

| | | | |
|---|---|---|---|
| 5,079,783 A * | 1/1992 | Haletsky | A47K 13/307 |
| | | | 4/217 |
| 5,309,146 A | 5/1994 | Kenet | |
| 5,839,357 A | 11/1998 | Ha et al. | |
| 5,888,388 A | 3/1999 | Kirk | |
| 5,900,138 A * | 5/1999 | Moretto | B01D 35/143 |
| | | | 116/264 |
| 6,049,930 A | 4/2000 | Hisano et al. | |
| 7,509,693 B1 * | 3/2009 | Graves | A47K 13/302 |
| | | | 4/233 |
| 7,754,090 B1 | 7/2010 | Berg | |
| 8,128,820 B2 * | 3/2012 | Wu | C02F 1/003 |
| | | | 210/251 |
| 8,872,130 B1 | 10/2014 | Matthews | |
| 8,975,596 B1 | 3/2015 | Matthews | |
| 2006/0163169 A1 | 7/2006 | Eckhartdt | |
| 2006/0231476 A1 * | 10/2006 | Vandenbelt | C02F 1/003 |
| | | | 210/266 |
| 2007/0256226 A1 | 11/2007 | Pinizzotto | |
| 2008/0134420 A1 | 6/2008 | Ho | |
| 2008/0203005 A1 | 8/2008 | Francisco | |
| 2008/0271231 A1 * | 11/2008 | Stauber | A47K 13/305 |
| | | | 4/246.1 |
| 2009/0026355 A1 | 1/2009 | Anderson | |
| 2012/0006995 A1 | 1/2012 | Greuel | |
| 2012/0132573 A1 | 5/2012 | Lautzenheiser | |
| 2012/0144569 A1 | 6/2012 | Kodat | |
| 2012/0180208 A1 | 7/2012 | White | |
| 2012/0235774 A1 | 9/2012 | Nakahashi et al. | |
| 2013/0319915 A1 | 12/2013 | Gellibolian | |
| 2014/0202948 A1 | 7/2014 | Li | |
| 2015/0101968 A1 | 4/2015 | Yoon | |
| 2015/0122688 A1 | 5/2015 | Dias | |
| 2015/0158741 A1 | 6/2015 | Lee | |

FOREIGN PATENT DOCUMENTS

| | | |
|---|---|---|
| CN | 101033091 | 9/2007 |
| CN | 101050039 | 10/2007 |
| CN | 201713395 | 1/2011 |
| CN | 102361823 | 2/2012 |
| CN | 202279750 | 6/2012 |
| CN | 102683117 | 9/2012 |
| CN | 203200118 | 9/2013 |
| CN | 103657224 | 3/2014 |
| CN | 203461291 | 3/2014 |
| CN | 203480326 | 3/2014 |
| CN | 203629187 | 6/2014 |
| CN | 104532930 | 4/2015 |
| CN | 204714554 | 10/2015 |
| CN | 106136909 | 11/2016 |
| JP | 3837210 | 10/2006 |
| KR | 1019970042284 | 7/1997 |
| KR | 20120004014 | 1/2012 |
| KR | 101372051 | 3/2014 |

* cited by examiner

WATER PURIFIER

CROSS-REFERENCE TO RELATED APPLICATION

This application is a continuation of U.S. application Ser. No. 16/355,054, filed on Mar. 15, 2019, now allowed, which is continuation of U.S. application Ser. No. 15/592,715, filed on May 11, 2017, now abandoned, which claims benefit to Korean Patent Application No. 10-2016-0058989 filed on May 13, 2016, the entire contents of which are hereby incorporated by reference in their entirety.

TECHNICAL FILED

The present application generally relates to technologies related to a water purifier.

BACKGROUND

A water purifier refers to an apparatus for purifying raw water such as tap water such that the raw water is suitable for drinking. Such a water purifier is classified variously into a natural filtration scheme, a direct filtration scheme, a distillation filtration scheme, a reverse osmosis scheme and the like. In current time, examples of the most commonly used filter include a natural filtration water purifier and a direct filtration water purifier that purify water by using a filter.

Such a water purifier using a filter includes a filter and a water storage tank. In some cases, a separate heater and a separate cooling system using a refrigerant may be provided to supply cold water and hot water.

SUMMARY

In general, one innovative aspect of the subject matter described in this specification can be implemented in a water purifier including: a body; a water storage tank that is located inside the body, that is configured to store water, and that includes an interior area and a first opening to the interior area; a cover unit that is configured to cover the first opening and that includes: a frame body (i) that is coupled to portions of the water storage tank that surround the first opening and (ii) that includes a second opening, and a water storage tank cover that is coupled to the frame body and that is configured to rotate about an axis such that the water storage tank cover opens or closes the second opening; a sterilizer that is located on a surface of the water storage tank cover and that is configured to sterilize water in the water storage tank; a switching module that is coupled to the frame body and that is configured to control electric power supply to the sterilizer; and an operation member that is located on the surface of the water storage tank cover and that is configured to control the switching module based on the water storage tank cover being opened or closed.

The foregoing and other implementations can each optionally include one or more of the following features, alone or in combination. In particular, one implementation includes all the following features in combination. The frame body includes: a recess on a first surface of the frame body, the recess accommodating the switching module. The operation member includes a magnet that is configured to generate a magnetic field, and wherein the switching module includes a reed switch that is configured to, in response to a magnetic field generated by the magnet, control electric power supply to the sterilizer. The water storage tank cover includes: a magnet receiving part that includes a recess accommodating the magnet. The magnet is arranged to face the switching module based on the water storage tank cover being opened or closed. In a state that the water storage tank cover is closed, the magnet is arranged to face the switching module. The switching module further includes: a switch cover that covers the reed switch and that is accommodated in the recess of the frame body. The switch cover includes: a plate that covers the reed switch, and hooks that extend from the plate and that are configured to catch the reed switch. The switch cover further includes: a fixing member including a first portion and a second portion, wherein the first portion of the fixing member is fixed to the plate, and wherein the second portion of the fixing member is movable to hold the water storage tank cover based on the water storage tank cover being opened or closed. In a state that the water storage tank cover is closed, the fixing member holds the water storage tank cover. The fixing member is made of flexible material such that the second portion of the fixing member is movable. The water purifier further includes: a hinge (i) that couples a first edge of the water storage tank cover to the frame body and (ii) that is configured to rotate about the axis along the first edge of the water storage tank cover, wherein the water storage tank cover is configured to rotate with the hinge about the axis. The water purifier further includes: a wire that passes through the hinge and that connects the sterilizer and the switching module. The switching module includes: a micro-switch that is configured to control electric power supply to the sterilizer, and wherein the operation member includes: a pressing protrusion that protrudes from the water storage tank cover and that is configured to, based on the water storage tank cover being opened or closed, press a portion of the micro-switch such that the micro-switch controls electric power supply to the sterilizer. The water purifier further includes: an extension that is coupled to the water storage tank cover, wherein the switching module includes: a micro-switch that is configured to control electric power supply to the sterilizer, and wherein the operation member includes: a pressing protrusion that protrudes from the extension and that is configured to, based on the water storage tank cover being opened or closed, press a portion of the micro-switch such that the micro-switch controls electric power supply to the sterilizer. The switching module includes: a switch case that accommodates the micro-switch, and a switch cover that covers the switch case and that includes a third opening, wherein the pressing protrusions is configured to press the portion of the micro-switch through the third opening. The portion of the micro-switch is a switch lever. In a state that the water storage tank cover is opened, the operation member is configured to turn off the switching module. In a state that the water storage tank cover is closed, the operation member is configured to turn on the switching module. The sterilizer is configured to emit ultraviolet rays.

The subject matter described in this specification can be implemented in particular examples so as to realize one or more of the following advantages. Comparing to a conventional water purifier, a water purifier includes a sterilizer that is operated based on a water storage tank cover being opened or closed. Thus, the water purifier does not require additional manipulation to operate or stop the sterilizer when a user opens or closes the water storage tank cover.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A water purifier is a device to purify water. In some implementations, the water purifier can be applied to various home appliances. For example, the water purifier can be applied to a water dispenser, a water cooler, an ice maker, a refrigerator, etc.

Figure 1:
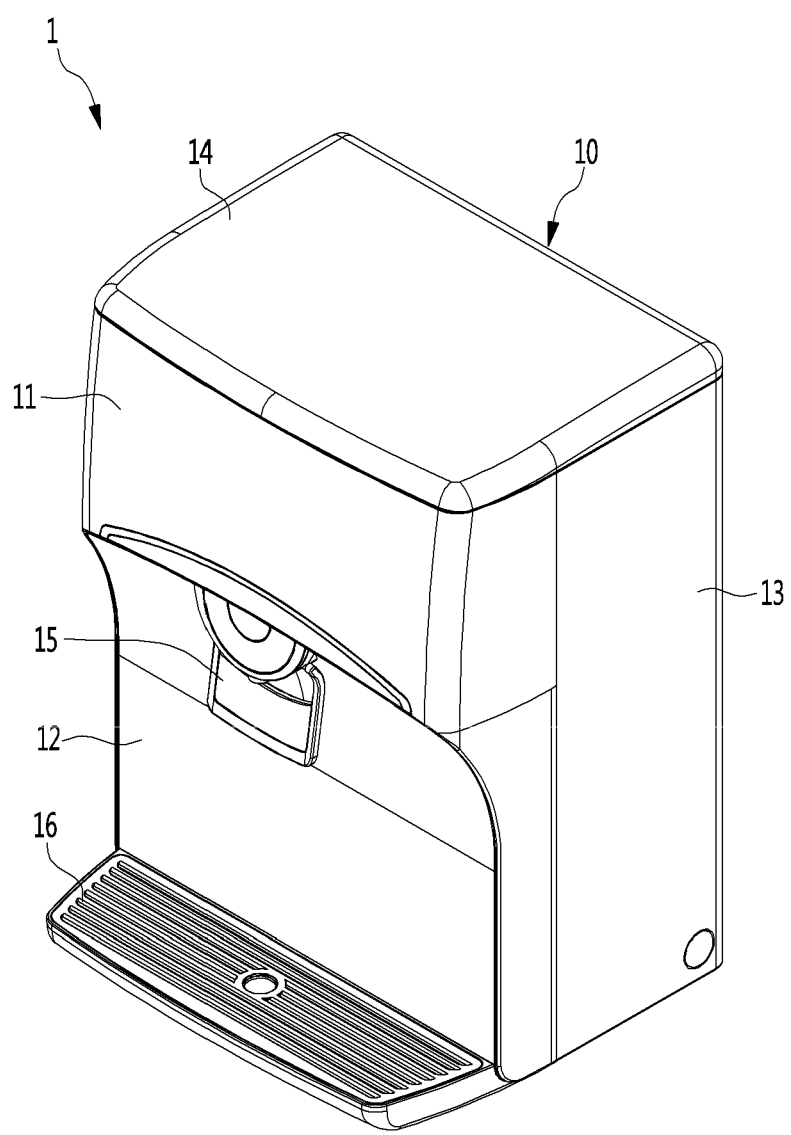
FIG. 1 is a diagram illustrating an example water purifier.
Figure 2:
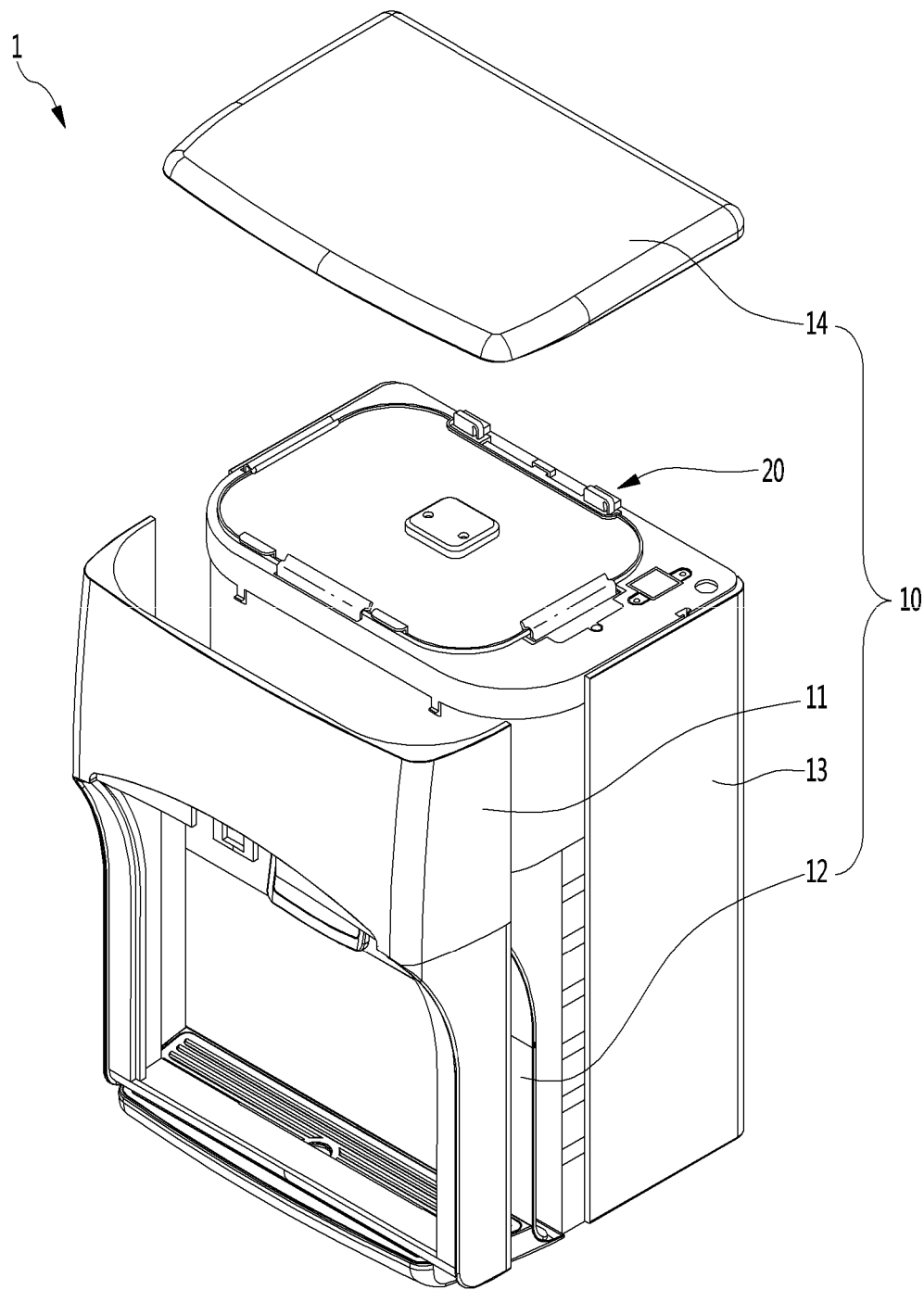
FIG. 2 is a diagram illustrating an example water storage tank assembly mounted on a water purifier.

FIG. 1 illustrates an example water purifier. FIG. 2 illustrates an example water storage tank assembly mounted on a water purifier.

Referring to FIGS. 1 and 2, a water purifier 1 includes a body 10 that defines an outer appearance.

The body 10 may include a first front panel 11 that defines a front upper portion of the body 10, a second front panel 12 that defines a front lower portion thereof, side panels 13 that define side surfaces thereof, and an upper panel 14 that defines an upper surface thereof.

The first front panel 11 may be arranged on a front surface of the body 10 and have an overall stepped shape. The first front panel 11 protrudes from a front upper portion of the body 10 such that a lower portion thereof may be opened according to a shape of the second front panel 12.

The second front panel 12 is arranged below the front surface of the body 10. The second front panel 12 may be coupled to the first front panel 11 by shielding an open area of the first front panel 11.

The side panels 13 are arranged on side surfaces of the body 10. The pair of side surfaces 13 are formed and may be formed on opposite side surfaces of the body 10, respectively. The pair of side panels 13 may be coupled to opposite side ends of the first front panel 11, respectively.

In some implementations, the upper panel 14 is arranged on an upper surface of the body 10. The upper panel 14 may simultaneously connect an upper end of the first front panel 11 and upper ends of the side panels 13.

That is, the body 10 may be protected while being surrounded by the first front panel 11, the second front panel 12, the side panels 13 and the upper panel 14.

In some implementations, a filter for purifying water introduced into the body 10 and a water storage tank assembly 20 in which the water purified by the filter is stored may be provided in an internal space of the body 10, which is shielded by the first front panel 11, the second front panel 12, the side panels 13 and the upper panel 14.

The water storage tank assembly 20 may be located on an upper side of the internal space and may be covered by the upper panel 14. The water stored in the water storage tank assembly 20 may be discharged to the outside to be supplied to a user. Here, the body 10 may further include a discharge unit 15 for discharging the water stored in the water storage tank assembly 20 to the outside.

The discharge unit 15 may be formed at any upper portion of the second front panel 12 and may include a water discharge part through which the water stored in the water storage tank assembly 20 is discharged. A water passage is formed inside the water discharge part so that the water stored in the water storage tank assembly 20 may be discharged to the discharge unit 15.

In some implementations, a water receiving tray 16 may be formed below the second front panel 12. The water receiving tray 16 may be located below the water discharge part such that water that is taken out from the water discharge part may be collected in the water receiving tray 16.

The internal space of the body 10 may further include at least one of a compressor that compresses a refrigerant, a heater that heats water supplied by the water storage tank assembly 20, a cold water tank in which cold water is stored and a hot water tank in which hot water is stored.

Figure 3:
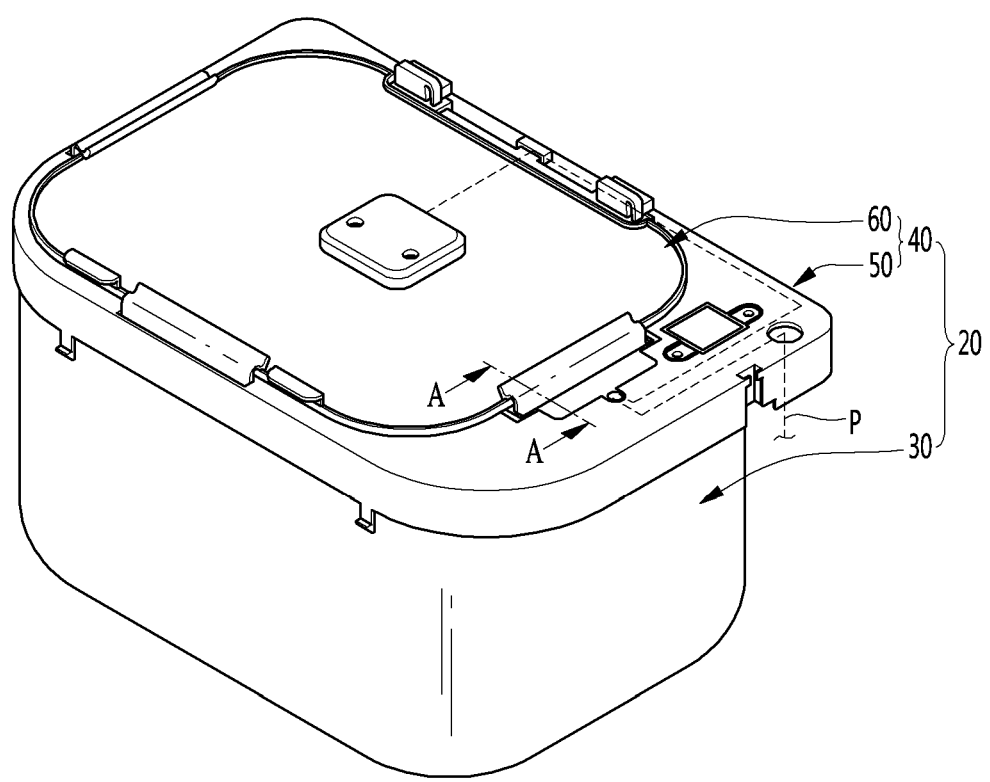
FIG. 3 is a diagram illustrating an example water storage tank assembly.
Figure 4:
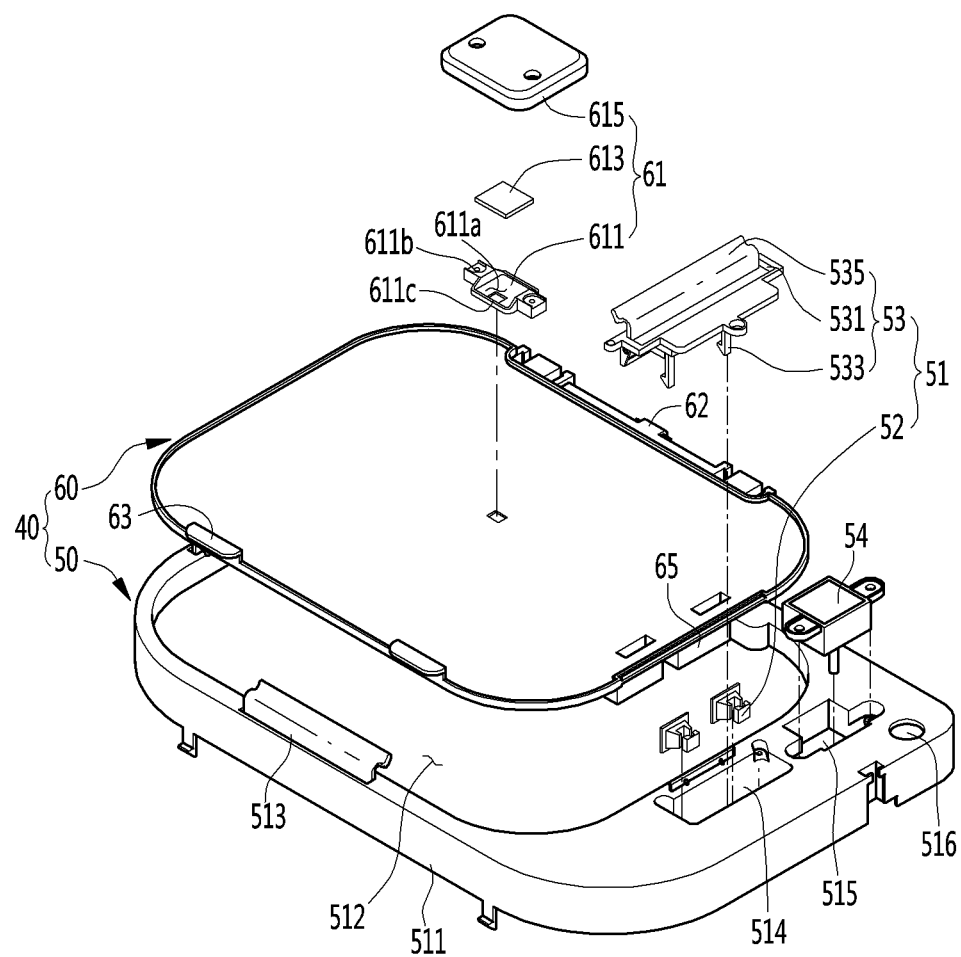
FIG. 4 is a diagram illustrating an example cover unit.

FIG. 3 illustrates an example water storage tank assembly. FIG. 4 illustrates an example cover unit.

Referring to FIGS. 3 and 4, the water storage tank assembly 20 includes a water storage tank 30 in which water is stored and a cover unit 40 for sealing an upper open surface of the water storage tank 30.

The water storage tank 30 may have various shapes. For example, the water storage tank 30 can be a box shape, a cylinder shape, a hexahedral shape, etc. In some implementations, an upper surface of the water storage tank 30 can be opened with a lid to fill water inside of the water storage tank 30. In some other implementations, an upper surface of the water storage tank 30 can include an opening through which water can be filled. The opening can be closed using a cap. In some other implementations, a coupling part for separably coupling the cover unit 40 to the water storage tank 30 is formed on an outer side of an upper end of the water storage tank 30. Thus, the cover unit 40 may be mounted on the water storage tank 30 by coupling a portion of the cover unit 40 to the coupling part of the water storage tank 30.

The cover unit 40 is located on the upper opened surface of the water storage tank 30 to serve to selectively open and close the water storage tank 30. Such a cover unit 40 may include a cover frame 50 that is mounted on an upper side of the water storage tank 30 and a water storage tank cover 60 that is mounted on an inner side of the cover frame 50.

In detail, the cover frame 50 includes a frame body 511 that is fixed to an upper side of the water storage tank 30. An opening 512 on which the water storage tank cover 60 is seated may be formed in the frame body 511 to have a through-formed frame shape. Thus, the water storage tank cover 60 may be seated on the opening 512 to be mounted on the cover frame 50.

A first fixing member 513 for fixing the water storage tank cover 60 to the frame body 511 when the water storage tank cover 60 is seated on the frame body 511 may be formed at an upper edge of the frame body 511.

The first fixing member 513 may be formed to be elastically deformable and to be bent at least one time to catch an edge of the water storage tank cover 60. Thus, the first fixing member 513 may fix the water storage tank cover 60 such that the water storage tank cover 60 is not separated from the opening 512 when the water storage tank cover 60 is seated on the frame body 511.

As an example, a plurality of first fixing members 513 may be formed. Here, the plurality of fixing members 513 may be arranged on the upper edge of the frame body 511 to be spaced apart from each other. Thus, the water storage tank cover 60 may be firmly mounted on the frame body 511 by the first fixing members 513.

A coupling part separably couples the frame body 511 to the water storage tank 30 is formed at an edge of a lower surface of the frame body 511. The coupling part of the frame body 511 may be separably coupled to the coupling part that is formed on the outer side of the upper end of the water storage tank 30.

In some implementations, a switching module 51 for operating a sterilizer which will be described below may be mounted on one side of the frame body 511. The switching module 51 may be coupled to an external power supply unit and the sterilizer which will be described below and may perform an on-off operation to selectively supply electric power to the sterilizer.

In some implementations, the switching module 51 may include reed switches 52.

For each reed switch 52, when two magnetic reed elements of the reed switch 52 are sealed in a glass tube. When these two magnetic reed elements are opened by elasticity of a spring, respective contact points of the two reed elements are coupled to each other by a magnetic circuit (e.g., closed state) when a magnet having magnetism becomes close thereto.

In this example, a closed state of the reed switch represents that the switching module is switched on. An open state of the reed switch represents that the switching module is switched off.

In this example, a magnet for switching on the reed switch 52 is mounted on the water storage tank cover 60. Thus, when the water storage tank cover 60 is closed, the reed switch 52 may be switched on, and when the water storage tank cover 60 is open, the reed switch 52 may be switched off.

A method for switching on/off the reed switch 52 based on opening/closing of the water storage tank cover 60 will be described below.

The above-described reed switch 52 may be received in a first recessed portion 514 that is recessed in an upper surface of the frame body 511.

The switching module 51 may further include a switch cover 53 that is inserted into the first recessed portion 514 in a state in which the reed switch 52 is coupled thereto.

The switch cover 53 may serve to support the reed switch 52 such that the reed switch 52 is operated in the first recessed portion 514 without shaking and prevent the water stored in the water storage tank 30 from being taken out and being penetrated into the reed switch 52.

In detail, the switch cover 53 may include a plate 531 that covers upper surfaces of the reed switches 52 and hooks 533 that extend from a lower surface of the plate 531 to catch the reed switches 52.

The plate 531 may be located on the upper surfaces of the reed switches 52 to shield the upper surfaces of the reed switches 52 and an open surface of the first recessed portion 514.

The hooks 533 extend downward from an edge of the plate 531 to catch portions of side surfaces and a bottom surface of the reed switches 52.

In some implementations, the switch cover 53 mat further include a second fixing member 535 that is formed on an upper surface of the plate 531.

The second fixing member 535 serves to catch the edge of the water storage tank cover 60, which is like the first fixing member 513.

The second fixing member 535 may be rotatably or elastically deformably coupled to the plate 531 to fix the edge of the water storage tank cover 60 to the frame body 511 in a state in which the water storage tank cover 60 is closed. As an example, the second fixing member 535 may be rotatably hinge-coupled to the plate 531 to be rotated by manipulation of a user. However, as another example, the second fixing member 535 may be formed of an elastically deformable material and may be fixed to one side of the plate 531.

A water level detecting sensor 54 for measuring a water level of the water stored in the water storage tank 30 may be provided on a lateral side of the frame body 511 on which the reed switches 52 are mounted.

The water level detecting sensor 54 may be received in a second recessed portion 515 that is recessed in a lateral side of the first recessed portion 514. The water level detecting sensor 54 may measure a water level of the water stored in the water storage tank 30 to provide the measured water level of the water to a control unit of the water purifier 1.

In some implementations, a power supply hole 516 through which a wire P, e.g., a signal line or a power line, that electrically connects the external power supply unit to the reed switches 52, the water level detecting sensor 54 and the sterilizer may be formed on any upper surface of the frame body 511. As an example, the power supply hole 516 may be formed through a corner on the upper surface of the frame body 511.

Electric power supplied by the power supply unit may be provided to the water level detecting sensor 54 and the sterilizer. Here, the signal line or power line P that extends from the sterilizer may pass through a hollow hole of a hinge (described below) formed in the water storage tank cover 60 to be coupled to the switching module 51 or the power supply unit.

In this example, the signal line or power line P that extends from the external power supply unit is coupled to the sterilizer through the switching module.

However, in some implementations, a positive line (+) of the power line may be coupled to the sterilizer through the switching module and a negative line (−) may be directly coupled to the sterilizer not through the switching module.

The water storage tank cover 60 may be seated on the opening 512 of the frame body 511 to serve to selectively open and close the upper open surface of the water storage tank 30.

In particular, the water storage tank cover 60 may be rotatably coupled to the frame body 511 to selectively open and close the opening 512. The water storage tank cover 60 may be formed to correspond to a shape of the open part 512 so as to be seated on the opening 512. Here, an edge of the water storage tank cover 60 may be stepped to be seated on the opening 512. Thus, when the water storage tank cover 60 is seated on the opening 512, a portion of the edge of the water storage tank cover 60 is fitted in the opening 512, so that the water storage tank cover 60 may be seated on the opening 512.

A hinge 62 may be formed at an edge of the water storage tank cover 60. The hinge 62 connects the edge of the water storage tank cover 60 and an edge of the frame body 511 to each other. The hinge 62 includes a hinge shaft that serves as a center of rotation of the water storage tank cover 60. Thus, the water storage tank cover 60 may be rotatably coupled to the frame body 511 by the hinge 62.

A handle 63 that is held by a user to open/close the water storage tank cover 60 may further provided on an opposite side to the edge of the water storage tank cover 60, at which the hinge 62 is formed.

The handle 63 may extend upward from the edge of the frame body 511 and be then bent sideward. A plurality of handles 63 may be provided, and the plurality of handles 63 may be spaced apart from each other.

A sterilizer 61 may be formed on the upper surface of the water storage tank cover 60.

In some implementations, the sterilizer 61 may emit ultraviolet rays to the water stored in the water storage tank 30. To this end, a slit may be formed through the upper surface of the water storage tank cover 60 and ultraviolet rays that are emitted by the sterilizer 61 pass through the slit and are moved to the water stored in the water storage tank 30.

The sterilizer 61 may include a mounting part 611 that is installed in the water storage tank cover 60 in which the slit is formed, an ultraviolet ray lamp 613 that is received in the mounting part 611 and a mounting part cover 614 that is arranged in the water storage tank cover 60 to completely cover the mounting part 611.

The mounting part 611 defines a receiving part 611a for receiving the ultraviolet lamp 613. Screw coupling parts 611b for screw-coupling the mounting part 611 and the mounting part cover 615 to each other may further formed on opposite sides of the mounting part 611.

In some implementations, a communication hole 611c through which the ultraviolet rays emitted by the ultraviolet ray lamp 613 pass through the slit may be formed on a bottom surface of the receiving part 611a of the mounting part 611. That is, the communication hole 611c may communicate the receiving part 611a and the slit such that the ultraviolet rays emitted by the ultraviolet ray lamp 613 are radiated into the water storage tank 30.

The ultraviolet ray lamp 613 is received in the receiving part 611a of the mounting part 611 and emits ultraviolet rays for sterilizing microorganisms that are proliferated in the water stored in the water storage tank 30.

The mounting part cover 614 may be positioned on the water storage tank cover 60 to completely cover the mounting part 611. The mounting part cover 615 may be screw-coupled to the screw coupling parts 611b of the mounting part 611 to be fixed to the mounting part 611.

In some implementations, an operation member that switches on or off the switching module 51 may be mounted on one side of the water storage tank cover 60. Here, the operation member may include a magnet M.

The magnet M may be received in a magnet receiving part 65 that is recessed in the upper surface of the water storage tank cover 60. In some implementations, in a state in which the water storage tank cover 60 is closed, the magnet M and the switching module 51 may face each other. Thus, when the water storage tank cover 60 is closed, the magnet M becomes closer to the switching module 51, and accordingly, the switching module 51 may be switched on (closed state). In some implementations, when the switching module 51 is switched on, the external power supply unit and the sterilizer 61 are coupled to each other, so that electric power is supplied to the sterilizer 61, and thus, the sterilizer 61 may be operated.

In some implementations, in a state in which the water storage tank cover 60 is open, the magnet M and the switching module 51 becomes farther away from each other, so that the switching module 51 may be switched off. When the switching module 51 is switched off, the external power supply unit and the sterilizer 61 are decoupled from each other, so that electric power supplied to the sterilizer 61 is interrupted, and thus, the operation of the sterilizer 61 may be terminated.

in some implementations, two switching modules are formed and two magnets for operating the two switching modules are also provided. When one switching module is installed, if the switching module is damaged, the sterilizer is not operated even when the water storage tank cover is closed. Thus, in this example, even when one switching module is damaged, the sterilizer may be driven by the other one switching module. In some other implementations, one switching module and one magnet may be provided.

Figure 5:
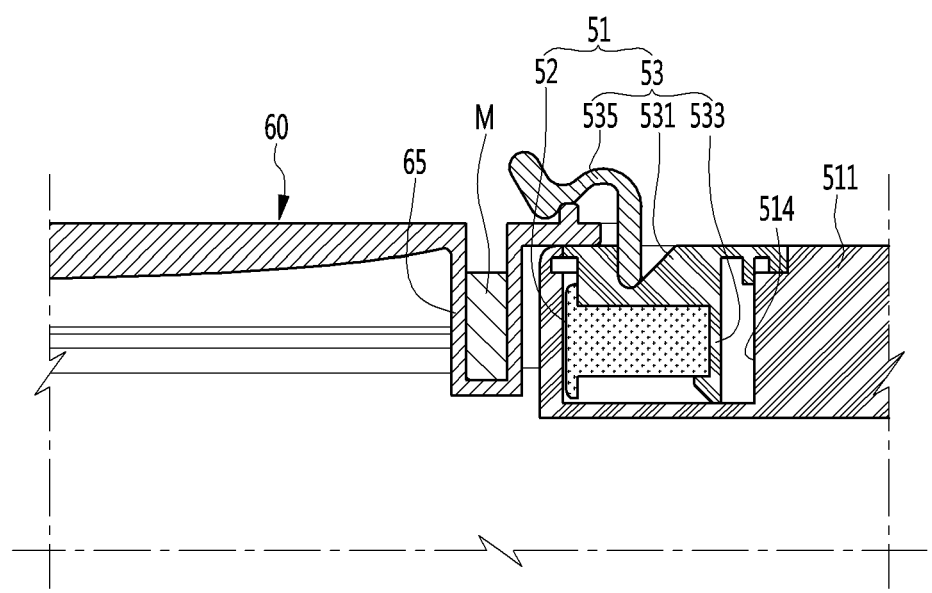
FIGS. 5 and 6 are diagrams illustrating an example water storage tank assembly in FIG. 3.
Figure 6:
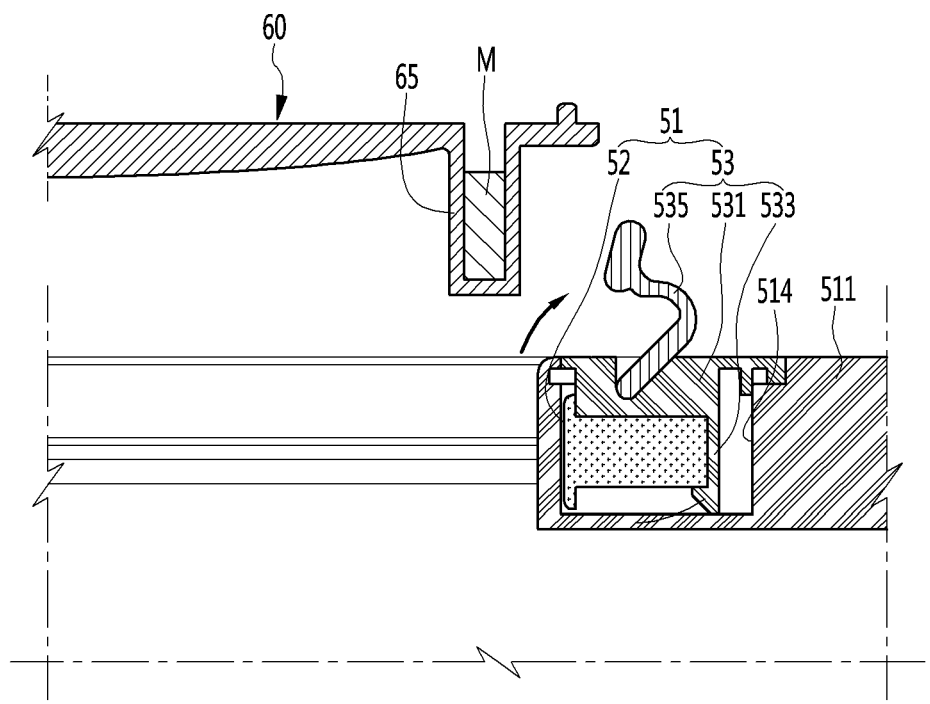

FIGS. 5 and 6 illustrate an example water storage tank assembly in FIG. 3. In FIG. 6, a water storage tank cover 60 of the water storage tank assembly is open.

Referring to FIG. 5, the water storage tank cover 60 is arranged to shield the open surface of the water storage tank 30. Here, the magnet M that is mounted on the water storage tank cover 60 becomes closer to the switching module 51 that is mounted on the frame body 51. Then, a magnetic field is generated based on the approaching of the magnet M and the reed switch 52 of the switching module 51 is switched on through the magnetic field. When the reed switch 52 is switched on, the external power supply unit and the sterilizer 61 are coupled to each other, so that electric power is supplied to the sterilizer 61, and thus, the sterilizer 61 may be operated.

Referring to FIG. 6, in some implementations, when the upper surface of the water storage tank 30 is opened by rotating the water storage tank cover 60, the magnet M becomes farther away from the switching module 51. Then, the reed switch 52 is switched off again, and accordingly, the electric power that supplied to the sterilizer 61 may be interrupted.

Figure 7:
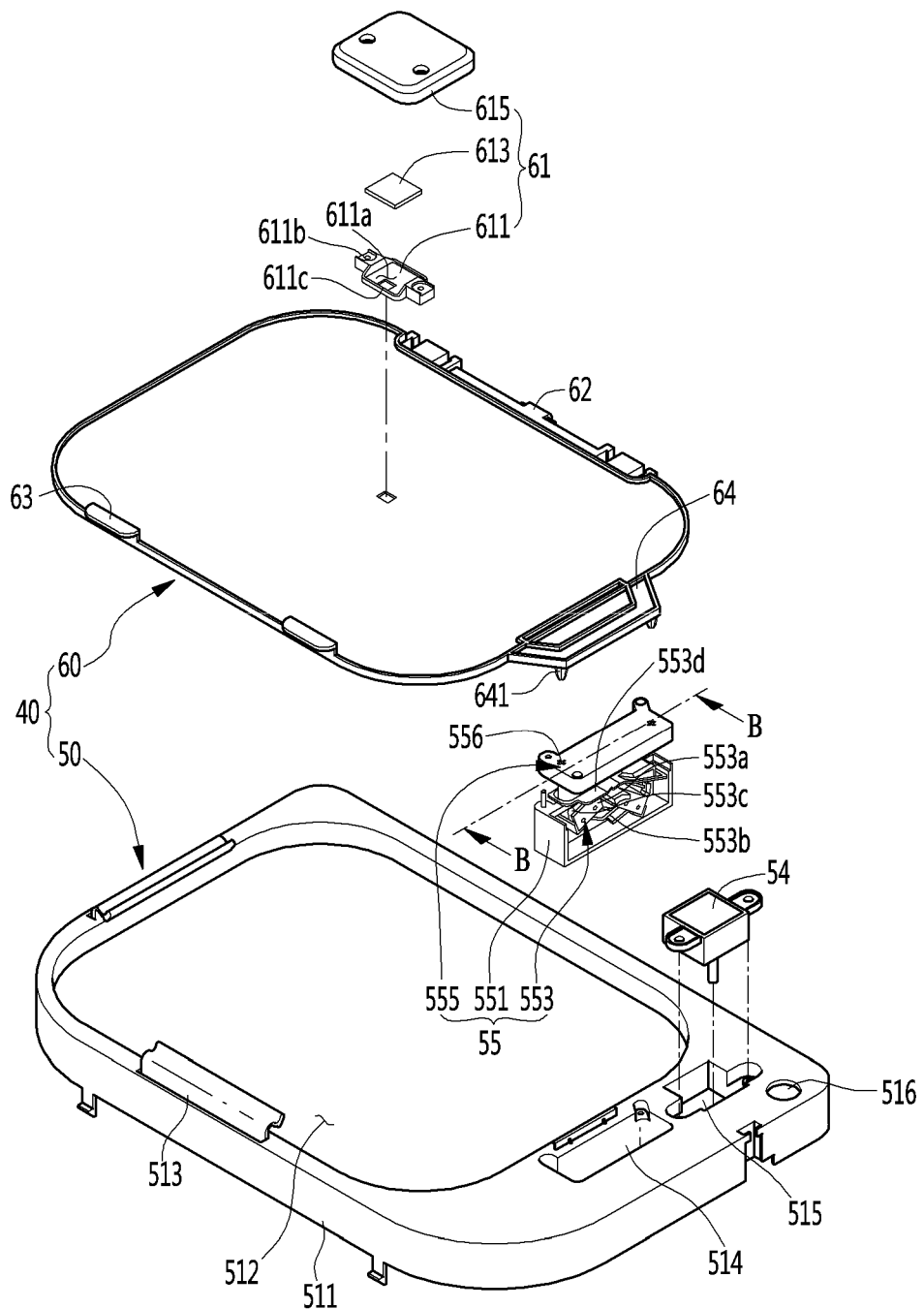
FIGS. 7, 8 and 9 are diagrams illustrating an example cover unit.

FIG. 7 illustrates an example cover unit.

Referring to FIG. 7, the cover unit 40 includes a cover frame 50 that is mounted on an upper surface of a water storage tank 30 in which water is stored and a water storage tank cover 60 that is mounted on an inner side of the cover frame 50.

The cover frame 50 is seated on the upper surface of the water storage tank 30 to cover an open upper surface of the water storage tank 30 and includes a frame body having an opening 512 formed therein.

A switching module 55 that performs an on-off operation to selectively supply electric power to the sterilizer 61 mounted on the water storage tank cover 60 is mounted in the frame body 511.

In detail, the switching module 55 may include a switch case 551, a micro-switch 553 that is received in the switch case 551 and a switch cover 555 that covers an upper surface of the switch case 551 and has through-holes 556 formed therein.

The switch case 551 has a reception part of which at least an upper surface is open and which receives the micro-switch 553. The switch case 551 may be inserted into a first recessed portion 514 that is recessed in an upper surface of the frame body 511.

The switch cover 555 is coupled to the switch case 551 to cover the micro-switch 553. Here, a portion of the switch cover 555 may be insert-coupled to a portion of the switch case 551.

The switch cover 555 may be formed to have a plate shape in which the through-holes 556 are formed. Here, the through-holes 556 may be located on an upper side of a switch lever (described below) of the switch case 551.

The micro-switch 553 may be received in the switch case 551 and perform an on-off operation to selectively supply electric power to the sterilizer 61. The micro-switch 553 may be switched on or off by an operation member (described below) that is formed in the water storage tank cover 60.

The micro-switch 553 may be, for example, a micro-switch that includes a contact mechanism that has a fine contact spacing and a snap operation mechanism and performs an opening/closing operation by a regulated operation and force.

In this example, a state in which the switching module is switched on refers to a state in which the micro-switch is in a closed state and a state in which the switching module is switched off refers to a state in which the micro-switch is in an open state.

In detail, the micro-switch 553 may include a switch body 553a, a terminal 553b that is formed on one side of the switch body 553a, a switch lever 553c that is provided on the other side of the switch body 553a and a resilient member 553d that is positioned outside the switch lever 553c.

That is, when the terminal 553b is maintained in an off state, when the resilient member 553d and the switch lever 553c are pressed, the terminal 553d may be changed to an on state. When the terminal is switched on, the external power supply unit and the sterilizer 61 are coupled to each other, so that electric power is supplied to the sterilizer 61, and thus, the sterilizer 61 may be operated.

In some implementations, the water storage tank cover 60 further includes an extension 64 that extends from an edge of the water storage tank cover 60.

In detail, the extension 64 further extends from the edge to a lateral side of the water storage tank cover 60 to cover the switching module 55.

The extension 64 further includes pressing protrusions 641 that protrude downward from a bottom surface of the extension 64.

The pressing protrusions 641 may serve as an operation member for pressing the switching lever 553c when the water storage tank cover 60 is closed.

That is, when the water storage tank cover 60 is closed, the pressing protrusions 641 pass through the through-holes 556 of the switch cover 555 to press the switch lever 553c of the micro-switch 553. Thus, when the water storage tank cover 60 is closed, the micro-switch 553 may be switched on by the pressing protrusions 641.

Figure 8:
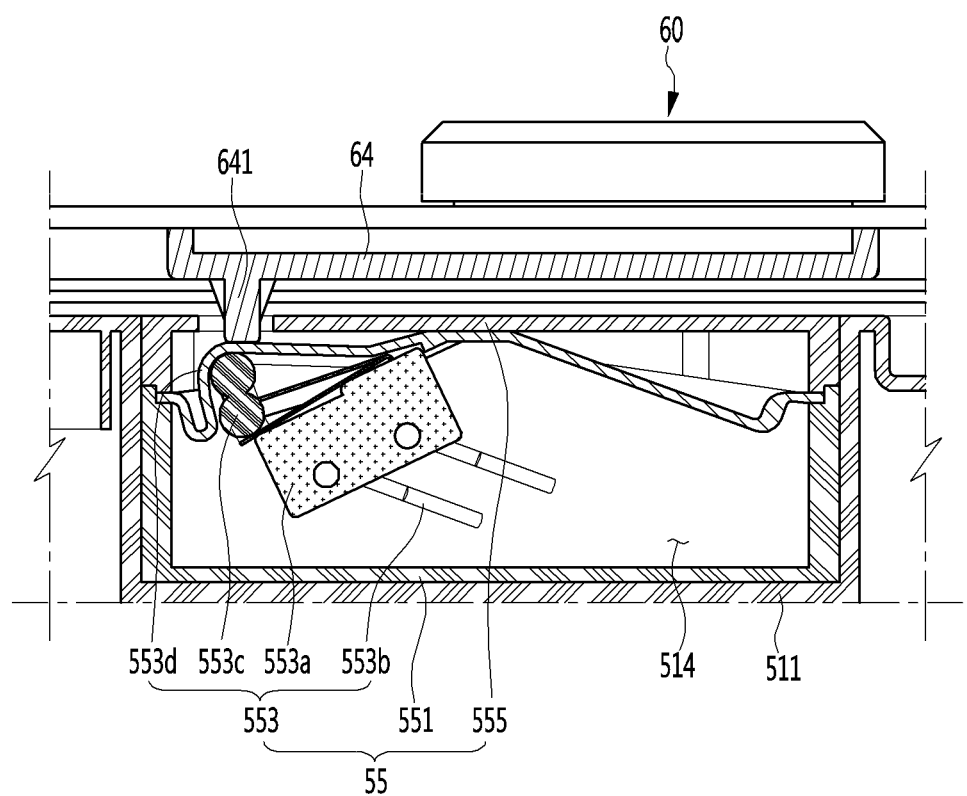
Figure 9:
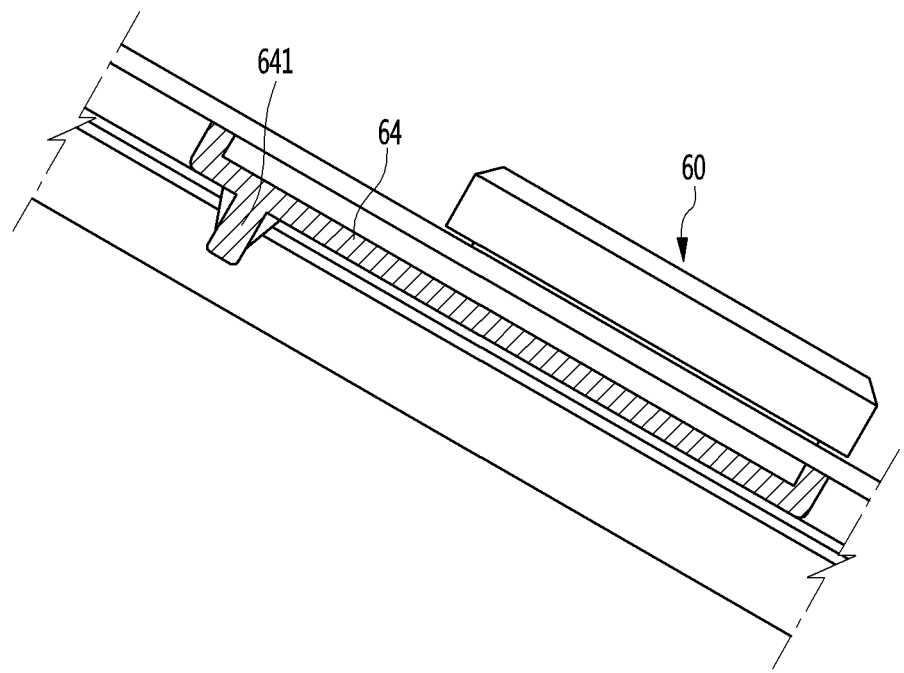
Figure 9:
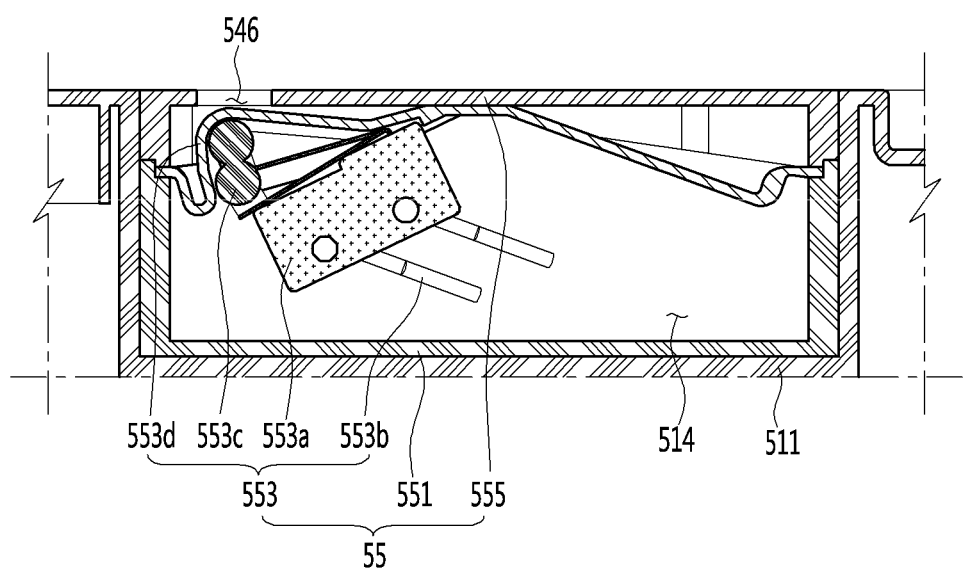

FIGS. 8 and 9 illustrate an example cover unit in FIG. 7. In FIG. 9, a water storage tank cover 60 is open.

Referring to FIG. 8, the water storage tank cover 60 is arranged to shield the open surface of the water storage tank 30. Here, the pressing protrusions 60 that are formed in the water storage tank cover 60 pass through the through-holes 556 of the switch cover 555 mounted on the frame body 511 to press the switch lever 553c of the micro-switch 553. Then, the micro-switch 553 is switched on and the external power supply unit and the sterilizer 61 are coupled to each other, so that electric power is supplied to the sterilizer 61, and thus, the sterilizer 61 may be operated.

Referring to FIG. 9, when the upper surface of the water storage tank 30 is opened by rotating the water storage tank cover 60, the pressing protrusions 641 are separated from the through-holes 556. Thus, as the switch lever 553c is depressed, the micro-switch 553 is switched off again, and accordingly, the electric power that supplied to the sterilizer 61 may be interrupted.

What is claimed is:

1. A water purifier comprising:
    a water storage tank that defines an interior area configured to store water and that defines a first opening in communication with the interior area;
    a cover unit that is configured to cover the first opening, the cover unit comprising:
        a frame body configured to couple to the water storage tank and to surround the first opening, the frame body defining a second opening configured to communicate with the first opening, and
        a water storage tank cover that is coupled to the frame body and that is configured to rotate relative to the frame body to thereby open and close the second opening;
    a sterilizer located at the water storage tank cover and configured to sterilize water in the water storage tank;
    a switching module coupled to the frame body, the switching module comprising a switch configured to control electric power to be supplied to the sterilizer; and
    an operation member located at the water storage tank cover and configured to control the switch based on the water storage tank cover being opened or closed,
    wherein the operation member comprises a pressing protrusion that protrudes from the water storage tank cover and that is configured to, based on the water storage tank cover being opened or closed, contact the switch to thereby control the electric power to be supplied to the sterilizer.

2. The water purifier of claim 1, wherein the frame body defines a recess that is recessed from a surface of the frame body and that accommodates the switching module.

3. The water purifier of claim 1, further comprising an extension portion coupled to the water storage tank cover, wherein the pressing protrusion protrudes from the extension portion.

4. The water purifier of claim 3, wherein the extension portion extends outward from a lateral side edge of the water storage tank cover and covers the switching module.

5. The water purifier of claim 3, wherein the pressing protrusion protrudes downward from a bottom surface of the extension portion.

6. The water purifier of claim 1, wherein the switching module further comprises:
    a switch case that accommodates the switch; and
    a switch cover that covers the switch case and that defines a third opening in communication with an inside of the switch case.

7. The water purifier of claim 6, wherein the pressing protrusion is configured to press the switch through the third opening.

8. The water purifier of claim 7, wherein the switch comprises a switch lever that is configured to be pressed by the pressing protrusion.

9. The water purifier of claim 1, further comprising:
    a hinge that couples an edge of the water storage tank cover to the frame body,
    wherein the water storage tank cover is configured to rotate about an axis extending along the hinge.

10. The water purifier of claim 9, further comprising:
    a wire that passes through the hinge and that connects the sterilizer and the switching module to each other.

11. The water purifier of claim 1, wherein the pressing protrusion is configured to separate from the switch to thereby turn off the switch based on the water storage tank cover being opened.

12. The water purifier of claim 1, wherein the pressing protrusion is configured to contact the switch to thereby turn on the switch based on the water storage tank cover being closed.

13. The water purifier of claim 1, wherein the sterilizer is configured to emit ultraviolet light.

14. The water purifier of claim 13, wherein the sterilizer comprises an ultraviolet light lamp that is configured to face the water storage tank, and that is located vertically below the water storage tank cover, and that is configured to emit the ultraviolet light to the water storage tank.

15. A water purifier comprising:
- a water storage tank that defines an interior area configured to store water and that defines a tank opening in communication with the interior area;
- a body that defines an outer appearance of the water purifier and is configured to house the water storage tank therein;
- a frame body that is configured to couple to the water storage tank and that defines a frame opening configured to communicate with the tank opening, and
- a water storage tank cover that is coupled to the frame body and that is configured to rotate relative to the frame body to thereby open and close the frame opening;
- a sterilizer located at the water storage tank cover and configured to sterilize water in the water storage tank;
- a protrusion that protrudes from the water storage tank cover toward the frame body; and
- a switch disposed at the frame body and configured to control electric power to be supplied to the sterilizer based on a distance between the protrusion and the switch.

16. The water purifier of claim 15, wherein the protrusion is configured to contact the switch based on the water storage tank cover being closed.

17. The water purifier of claim 15, wherein the switch is configured to, based on a decrease of the distance between the protrusion and the switch, be turned on to thereby supply the electric power to the sterilizer.

18. The water purifier of claim 17, wherein the switch is configured to, based on an increase of the distance between the protrusion and the switch, be turned off to thereby cut off the electric power supplied to the sterilizer.

19. The water purifier of claim 15, further comprising:
- a switch case that is disposed at the frame body and that accommodates the switch; and
- a switch cover that covers the switch case and that defines a through-hole configured to receive the protrusion based on rotation of the water storage tank cover.

20. The water purifier of claim 19, wherein the frame body defines a recess that is recessed from an upper surface of the frame body and that accommodates the switch case and the switch cover.

\* \* \* \* \*